US011781574B2

(12) United States Patent
Mauro (10) Patent No.: US 11,781,574 B2
(45) Date of Patent: Oct. 10, 2023

(54) PROBE FASTENING SYSTEM AND AIRCRAFT

(71) Applicant: Premium Aerotec GmbH, Augsburg (DE)

(72) Inventor: Pasquale Mauro, Augsburg (DE)

(73) Assignee: Premium Aerotec GmbH

( * ) Notice: Subject to any disclaimer, the term of this patent is extended or adjusted under 35 U.S.C. 154(b) by 1063 days.

(21) Appl. No.: 16/207,668

(22) Filed: Dec. 3, 2018

(65) Prior Publication Data

US 2019/0178272 A1 Jun. 13, 2019

(30) Foreign Application Priority Data

Dec. 7, 2017 (DE) ...................... 10 2017 222 185.2

(51) Int. Cl.
*F16B 5/02* (2006.01)
*F16B 5/00* (2006.01)
*B64D 43/00* (2006.01)

(52) U.S. Cl.
CPC ............ *F16B 5/025* (2013.01); *F16B 5/0088* (2013.01); *B64D 43/00* (2013.01); *Y10T 403/1624* (2015.01); *Y10T 403/581* (2015.01)

(58) Field of Classification Search
CPC .... F16B 5/0004; F16B 5/0008; F16B 5/0088; F16B 5/0092; F16B 5/02; F16B 5/025; Y10T 403/1616; Y10T 403/1624; Y10T 403/58; Y10T 403/581; Y10T 403/583; Y10T 403/75; B64D 43/00; B64D 43/02
See application file for complete search history.

(56) References Cited

U.S. PATENT DOCUMENTS

| 4,526,641 A * | 7/1985 | Schriever ................ F16B 43/00 156/247 |
| 4,884,929 A | 12/1989 | Smith et al. |
| 6,622,390 B2 * | 9/2003 | Brusius .................. G01C 15/00 33/286 |
| 6,672,152 B2 * | 1/2004 | Rouse ................... G01P 13/025 73/170.01 |
| 7,210,693 B2 * | 5/2007 | Ingalls ................... B62D 17/00 280/86.756 |
| 9,377,038 B2 * | 6/2016 | David ....................... B64C 1/26 |

(Continued)

FOREIGN PATENT DOCUMENTS

DE 68921484 T2 6/1995
DE 60208922 T2 9/2006

(Continued)

*Primary Examiner* — Josh Skroupa
*Assistant Examiner* — Kevin J Baynes
(74) *Attorney, Agent, or Firm* — Lerner David LLP (57) ABSTRACT

A probe fastening system has a plate having at least one coupling-on recess and having at least one alignment element, which is arranged in the outer region of the plate, a backplate which has a fastening device for the fastening of a static probe and at least one recess which corresponds with the alignment element, at least one peelable shim which corresponds with the alignment element and which is arranged between the plate and the backplate, at least one alignment device which corresponds with the alignment element, and a coupling-on element which defines a cavity and which is designed for isobarically coupling the static probe onto the coupling-on recess.

14 Claims, 5 Drawing Sheets

(56) References Cited

U.S. PATENT DOCUMENTS

| | | | |
|---|---|---|---|
| 9,493,247 B2 * | 11/2016 | Reye | B64D 43/00 |
| 9,562,559 B2 | 2/2017 | Schomaker et al. | |
| 9,939,005 B2 * | 4/2018 | Foenander | F16B 37/044 |
| 9,963,242 B1 * | 5/2018 | Lockhart | G01K 1/14 |
| 10,293,954 B2 * | 5/2019 | Lockhart | G01L 7/00 |
| 10,472,074 B2 * | 11/2019 | Desjardins | B64D 15/06 |
| 2005/0079782 A1 | 4/2005 | Gastel | |
| 2013/0180096 A1 * | 7/2013 | David | F16B 5/00 |
| | | | 29/525.01 |
| 2015/0034782 A1 * | 2/2015 | Reye | B64D 43/00 |
| | | | 248/205.1 |
| 2015/0059465 A1 * | 3/2015 | Leblond | B64D 43/02 |
| | | | 73/170.02 |
| 2015/0082878 A1 * | 3/2015 | Bigand | G01P 13/025 |
| | | | 73/180 |
| 2016/0347439 A1 * | 12/2016 | Christensen | F16B 37/04 |
| 2017/0028671 A1 | 2/2017 | Martin | |
| 2017/0029124 A1 * | 2/2017 | Hodot | F28D 15/043 |

FOREIGN PATENT DOCUMENTS

| | | | |
|---|---|---|---|
| DE | 202011107070 U1 | 2/2013 | |
| DE | 102012202053 A1 | 8/2013 | |
| EP | 1145952 A1 * | 10/2001 | G01P 13/025 |
| EP | 2393710 B1 | 3/2014 | |
| FR | 2932456 A1 * | 12/2009 | B64D 45/02 |
| FR | 2990191 A1 * | 11/2013 | B64D 43/02 |
| FR | 3034753 A1 * | 10/2016 | G01P 5/165 |
| WO | 2015158751 A1 | 10/2015 | |

\* cited by examiner

PROBE FASTENING SYSTEM AND AIRCRAFT

FIELD OF THE INVENTION

The present invention relates to a probe fastening system, to a clamping apparatus, and to an aircraft.

BACKGROUND OF THE INVENTION

The cockpits of aircraft have a number of barometric flight instruments which assist the pilots in correctly controlling the aircraft. These flight instruments are fed with pressure information by means of pitot-static systems. Important constituent parts of this pitot-static system are static probes, which are coupled to the outer side of the aircraft and measure the outside air pressure.

For this purpose, the edges of the fastening that couples the static probe to the aircraft skin and the aircraft skin should lie on one another in as flush a manner as possible in order to minimize air turbulence, which itself can falsify the measurement results of the static probe.

To set the fastening for an extremely accurately fitting form combination, in the applicant's in-house prior art, use is made of large-area tolerance compensation layers which are composed of a multiplicity of very thin individual foils and adhesive layers applied in between. Such peelable shims are described for example in DE 20 2011 107 070 U1.

This known solution relocates the edge between fastening system and aircraft skin uniformly over the entire region of the fastening system. A concern here is that aircraft are normally delivered in a so-called "green" state to airlines. After delivery, the airline paints the outer side of the aircraft fuselage with an aesthetically appealing paint and possibly with logos of the airline. The aircraft manufacturer then self-evidently has no control of the application of these paint layers, and in particular has no control over the uniformity of the thickness of the paint layers.

BRIEF SUMMARY OF THE INVENTION

Against this background, an aspect of the present invention may provide a means for realignment of the static probes after the painting process, in such a way that, even in the presence of possible irregularities in the paint layer, it is made possible to realize an extremely accurately fitting form combination of the static probe with respect to the aircraft skin.

According to an embodiment, a probe fastening system is provided. The fastening system comprises a plate having at least one coupling-on recess and having at least one alignment element, which is arranged in the outer region of the plate, a backplate which has a fastening device for the fastening of a static probe and at least one recess which corresponds with the alignment element, at least one peelable shim which corresponds with the alignment element and which is arranged between the plate and the backplate, at least one alignment device which corresponds with the alignment element, and a coupling-on element which defines a cavity and which is designed for isobarically coupling the static probe onto the coupling-on recess.

An aircraft is furthermore provided according to another embodiment. The aircraft comprises a fastening system arranged on the fuselage of the aircraft, wherein the fastening system is arranged such that one of the alignment elements of the fastening system is oriented in a direction flight of the aircraft.

A concept on which the present invention is based consists in decentralising the alignment of the form combination of the aerodynamic plate with respect to the, possibly painted, aircraft skin. Accordingly, the form combination can, after the installation of the static probe or the painting of the aircraft skin, be adapted to any unevennesses present in the paint layer. In this way, it can be ensured, aside from a general optimization of the form combination, that in particular the important edge in the direction of flight of the aircraft is formed flush with respect to the surface.

Advantageous designs and refinements will emerge from the further subclaims and from the description with reference to the figures.

In one refinement, the plate may have an even number of alignment elements, which are arranged pairwise on substantially opposite sides of the plate. This permits a particularly fine setting of the form combination along a selected axis, advantageously along the direction of flight axis of the aircraft.

In one refinement, the plate may have four alignment elements, which are arranged rotationally symmetrically. This arrangement permits, in an advantageously clear manner, an extremely accurately fitting flush configuration of the form combination over an entire circumference.

In one exemplary embodiment, the alignment elements may be of hollow form and comprise an internal thread, wherein the recesses of the backplate comprise a cylinder wall, and the alignment devices comprise screws, the threads of which are adapted to the internal threads of the alignment elements, and the heads of which are designed to lie on the cylinder walls of the backplate.

In one refinement, the alignment elements may comprise an external thread, and the alignment devices may comprise nuts with internal threads adapted to the external threads of the alignment elements.

In one exemplary embodiment, each of these alignment elements may have a laterally arranged recess, wherein the alignment device comprises a splint, which is designed to be inserted into and wedged in the recess of the alignment element. In this way, the situation is advantageously prevented in which the nut loosens over the course of time, and the form combination of the aerodynamic plate is impaired.

In one refinement, said alignment elements may be of hollow form. This saves material and weight, which is advantageously desired in the aviation sector.

In one exemplary embodiment, the alignment device may comprise a cover which is arranged in each case over one of the alignment elements. This serves for the additional fastening of the splint and thus also for an improved fastening of the nut.

In one refinement, additional fastening means may be provided for fastening the plate to the backplate. This relieves the alignment elements of load, because forces acting on the aerodynamic plate are advantageously intercepted by the fastening means, whereby the alignment of the form combination is maintained during the operation of the aircraft.

In one refinement, said fastening means may comprise a peelable spacer element. In this way, the possibility of alignment of the form combination of the aerodynamic plate using the fastening means is facilitated. It is particularly advantageously possible here for a coarse alignment of the aerodynamic plate as a whole to be performed by means of the spacer element, and for the alignment elements to serve for a fine alignment of the individual directions of the aerodynamic plate.

In one exemplary embodiment, the backplate may have a wall element, and the fastening devices may be formed as part of the wall element. Such a wall element provides the fastening system with advantageous structural stability, and permits a likewise advantageous stable fastening of the static probe. Such a wall element also permits the advantageous design of further functional features, such as for example of an earthing device for protection against lightning strikes during flight.

The coupling-on element for the isobaric coupling of the static probe onto the coupling-on recess may be formed integrally with the plate or with the backplate.

The invention furthermore provides a clamping apparatus for the mounting of a fastening system onto an aircraft skin. The clamping apparatus has a body which is designed to fill the cavity defined by the coupling-on element, and a fixing plate which is designed to be connected to the fastening devices.

The above designs and refinements may be combined with one another in any desired manner where expedient. Further possible designs, refinements and implementations of the invention also encompass combinations, which have not explicitly been mentioned, of features of the invention described above or below with respect to the exemplary embodiments. In particular, here, a person skilled in the art will also add individual aspects as improvements or additions to the respective basic form of the present invention.

BRIEF DESCRIPTION OF THE DRAWINGS

The present invention will be discussed in more detail below on the basis of the exemplary embodiments specified in the schematic figures, in which.

DETAILED DESCRIPTION

The appended figures are intended to impart further understanding of the embodiments of the invention. They illustrate embodiments and serve, in conjunction with the description, for the explanation of principles and concepts of the invention. Other embodiments, and several of the stated advantages, will emerge with regard to the drawings. The elements of the drawings are shown not necessarily true to scale with respect to one another.

In the figures of the drawing, elements, features and components which are identical, functionally identical and of identical action are denoted in each case by the same reference designations unless stated otherwise.

Figure 1:
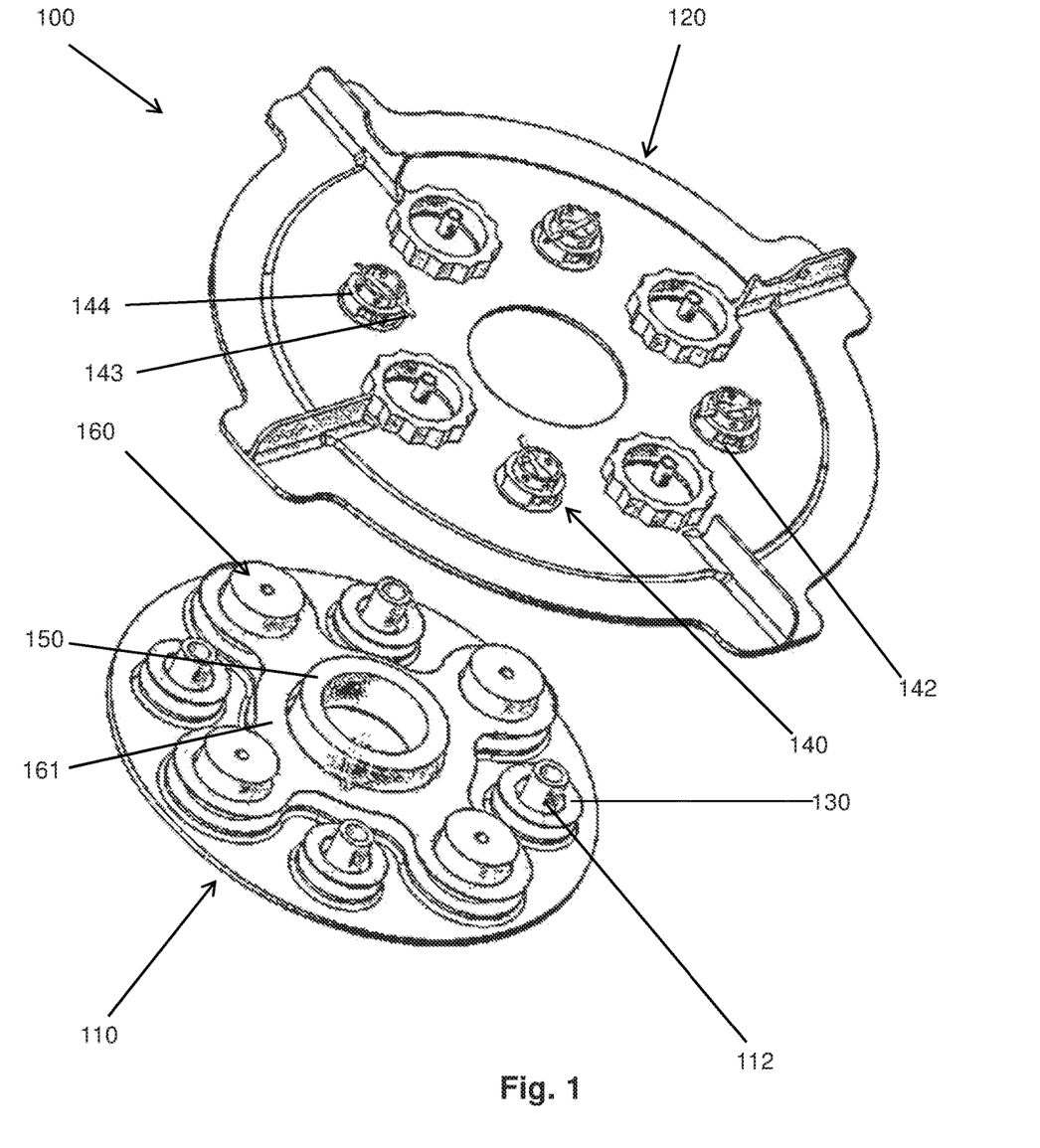
FIG. 1 shows a schematic view of an exemplary embodiment of a fastening apparatus in the unmounted state.

FIG. 1 shows a schematic view of an exemplary embodiment of a fastening system 100. FIG. 1 illustrates the plate 110 and the backplate 120 separately from one another. The plate 110 has in this case a total of four alignment elements 112, which are arranged rotationally symmetrically. In this exemplary embodiment, the alignment elements comprise external threads, which is however not explicitly illustrated in FIG. 1 for the sake of simplicity. Illustrated for each of the alignment elements 112 is a corresponding peelable shim 130, which surrounds the body of the respective alignment element 112. A coupling-on element 150 in the form of a cylindrical wall is, in this exemplary embodiment, formed integrally with the plate 110. In this exemplary embodiment, the fastening system 100 also has fastening means 160 in the form of four cylindrical bodies arranged offset rotationally symmetrically with respect to the alignment elements. The fastening means 160 also comprise a peelable spacer element 161, which surrounds both the cylindrical bodies of the fastening means 160 and the cylindrical wall of the coupling-on element 150. The backplate 120 shown in FIG. 1 comprises a central hole, which corresponds with the coupling-on element 150. The recesses 122 of the backplate are not visible in FIG. 1, because they are covered by the alignment devices 140. The alignment devices 140 comprise, in this exemplary embodiment, nuts 142, splints 143 and covers 144. Also shown are additional nuts which are provided for the fixing of the fastening means 160 to the backplate. In this exemplary embodiment, the backplate 120 also has additional stiffening elements which are intended to impart additional structural stability to the fastening system 100.

For the alignment of the form combination of the plate, the elements shown here are joined together and the backplate 120 is fastened to the inner side of an aircraft skin. Subsequently, the projecting length of the plate 110 relative to the edge of the aircraft skin, possibly with paint layer, can be determined. The plate 110 is thereupon released from the backplate 120 again. The thickness of the peelable shims 130 and of the peelable spacer element 160 is adapted by detachment of a corresponding number of layers. After reattachment of the plate 110 to the backplate 120 and tightening of the nuts 141 of the alignment devices 140, the plate 110 and the edge of the aircraft skin now have an extremely accurately fitting form combination.

In the exemplary embodiments shown in FIG. 1 and other figures, the alignment elements 112 have a cylindrical form. This is particularly advantageous for the design, provided in this exemplary embodiment, of the alignment elements 112 with external threads and the design of the alignment devices 140 with nuts 142. In general, the alignment elements 112 may however have any desired shape, for example cuboidal.

Figure 2:
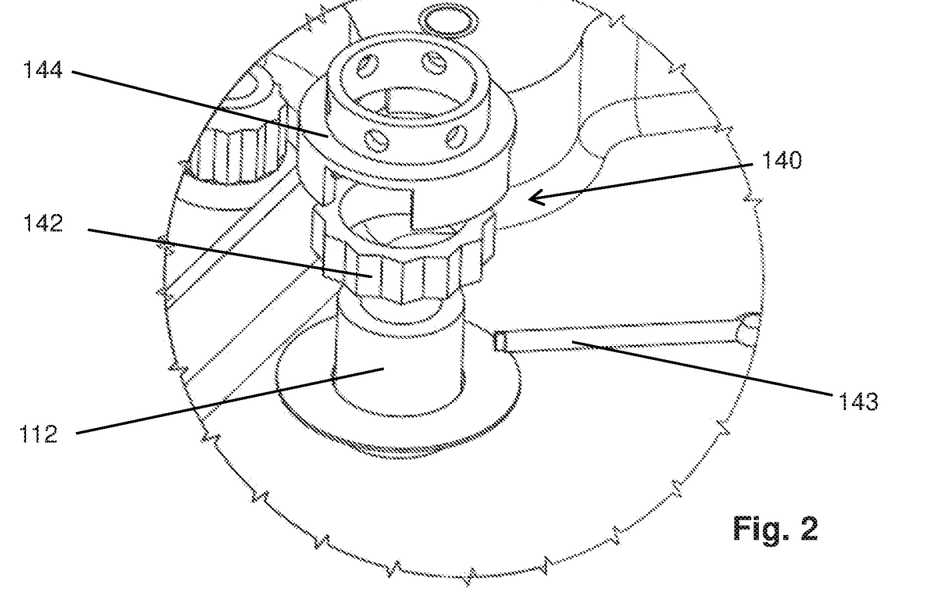
FIG. 2 shows a schematic detailed view of an alignment element and of an alignment device in the unmounted state.

FIG. 2 shows a schematic detailed view of an alignment element 112 and of an alignment device 140 from FIG. 1, before the plate 110 and the backplate 120 are fastened to one another. FIG. 2 illustrates the cylindrical body of the alignment element 112, wherein, as in FIG. 1, the external thread of the alignment element 112 is not illustrated for the sake of simplicity. The splint 143 is in this case illustrated laterally offset with respect to the alignment element 112. After the mounting of the alignment device 140, the splint 143 is inserted into the holes of the cover 144 and of the alignment element 112. The nut 142 of the alignment device 140 is illustrated over the end of the alignment element 112. The cover 144 is illustrated above the nut 142. Also illustrated is a washer which may advantageously be provided in order to provide a better bearing surface for the nut 142 and protect the surface of the backplate 120.

In this exemplary embodiment, the cover 144 has a total of six holes, of which four are visible owing to the perspective. Said holes permit advantageous fixing of the cover 144 by means of the splint 143, wherein the orientation of the cover can be varied. In this exemplary embodiment, the cover 144 also has a further recess, which exposes a part of the nut 142 after the mounting process. In this way, after a certain length of time, the nut 142 can be re-tightened in order to maintain the alignment of the plate 110 without the need for the cover 144 to be removed for this purpose.

Figure 3:
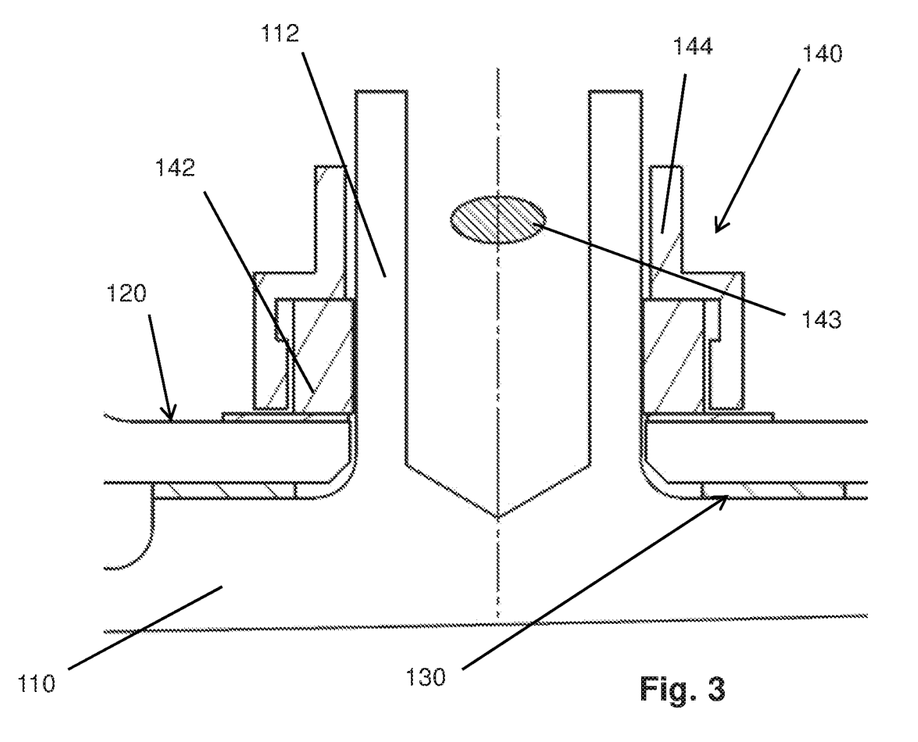
FIG. 3 shows a schematic sectional view of an alignment element and of an alignment device in the mounted state.

FIG. 3 shows a schematic sectional view of an alignment device from FIGS. 1 and 2 after the fastening of the plate 110 to the backplate 120. The nut 142 has been screwed onto the alignment element 112 such that the nut 142, the optional washer, the backplate 120, the peelable shim 130 and the plate 110 each lie against one another with a form fit. The splint 143 fixes the cover 144 to the alignment element 112, and prevents the detachment of the nut 142.

In this configuration, the spacing between the plate 110 and the backplate 120 at the position of the alignment element 112 is predefined only by the thickness of the peelable shim 130. The spacing can thus be modified by decreasing the thickness of the peelable shim 130 by removing individual layers, and the nut 142 is thereafter tightened again as far as a stop. In this way, the projecting length of the plate 110 in relation to the edge of the aircraft skin on the side of the alignment element 112 can be varied. Through the attachment of peelable shims 130 of different thickness to different alignment elements 112, it is thus possible to realize an accurately fitting flush configuration of the form combination between plate and aircraft skin in all directions, even if unevennesses are present for example owing to varying thickness of a paint layer.

Figure 4:
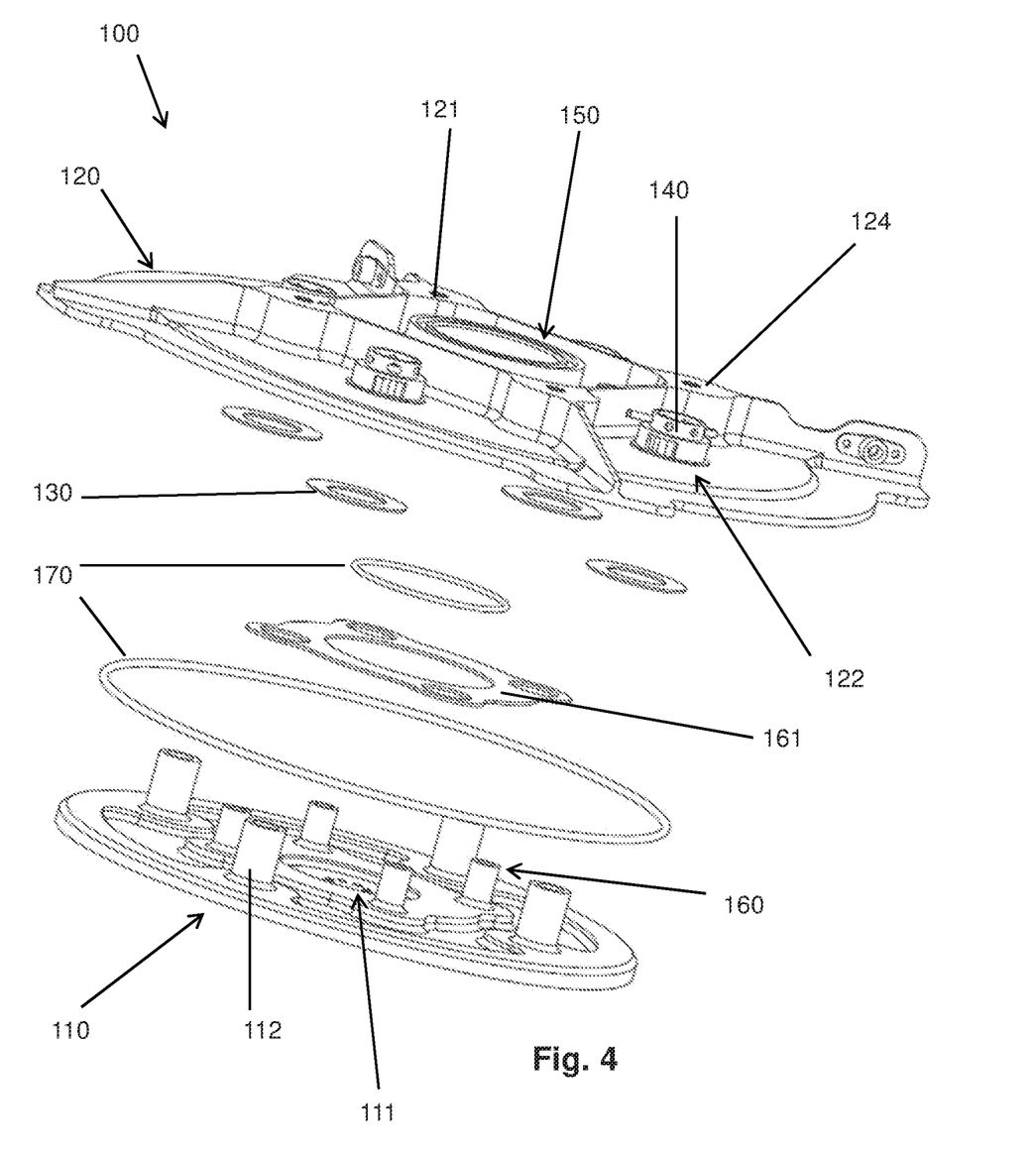
FIG. 4 shows a schematic exploded view of a further exemplary embodiment of a fastening apparatus.

FIG. 4 shows a schematic exploded view of a further exemplary embodiment of a fastening system 100. The exemplary embodiment shown here differs from the exemplary embodiment shown in FIG. 1 in that the backplate has a wall element 124, and in that the coupling-on element 150 is in this case formed integrally with the backplate. The cylindrical bodies, shown here, of the fastening means 160 are arranged rotationally symmetrically along a circle with a somewhat smaller radius than the circle on which the alignment elements 112 are arranged. Situated so as to be arranged centrally in the plate 110 is a circle of a total of eight coupling-on recesses 111. The peelable shims 130 and an optional peelable spacer element 161 are shown in FIG. 4 as being situated between the plate 110 and the backplate 120. The wall element 124 comprises a substantially square wall with rounded corners, which in the mounted state separates the fastening means 160 from the alignment elements 112. At the rounded corners, the wall element 124 has thickened portions with fastening devices 121 in the form of receptacles for screws. Extending radially outwards from the thickened portions, the wall element 124 furthermore has stiffening elements. Likewise shown between the plate 110 and the backplate 120 are two sealing rings 170, one with a small radius and one with a large radius. Said sealing rings 170 serve, after the mounting process, for improving the sealing action of the connection between plate 110 and backplate 120.

Figure 5A:
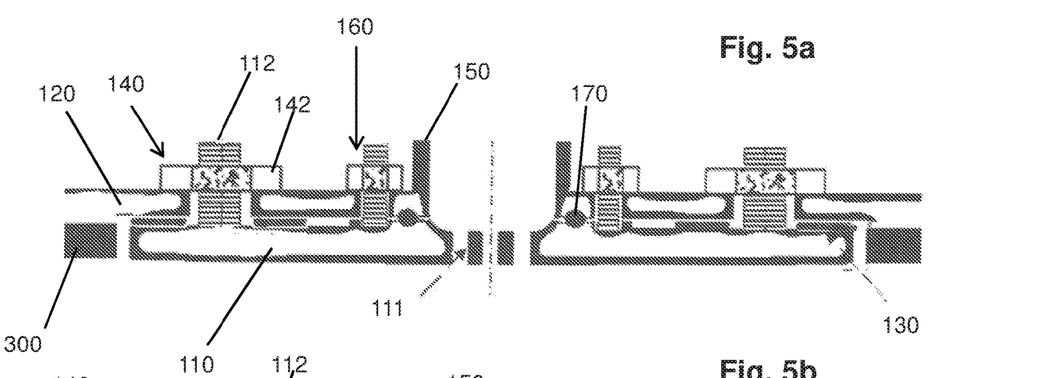
FIGS. 5a-5c show schematic sectional views of three exemplary embodiments of a fastening apparatus.
Figure 5B:
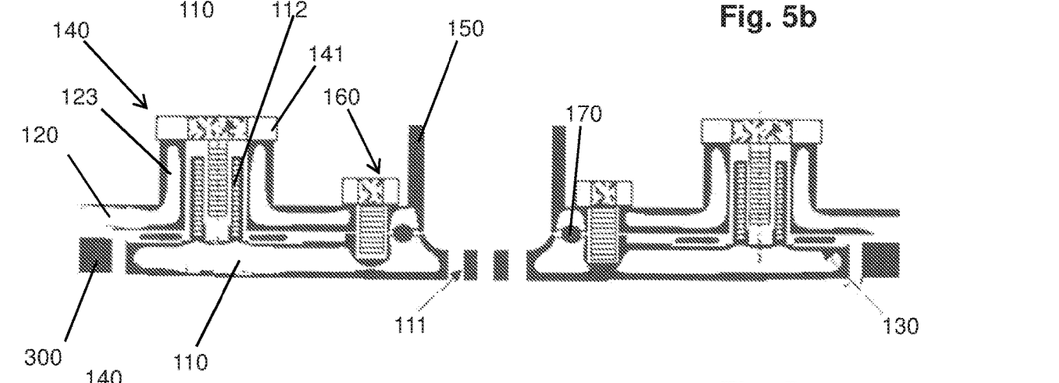
Figure 5C:
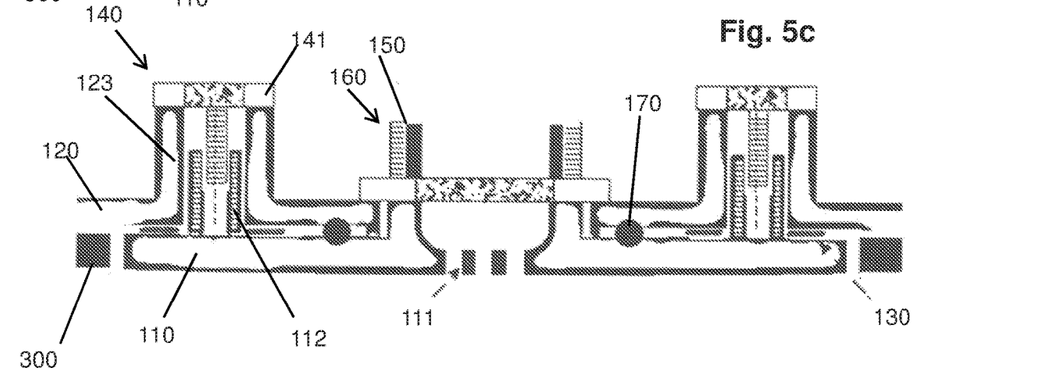

FIGS. 5a to 5c are schematic sectional illustrations of various exemplary embodiments of fastening systems 100.

FIG. 5a shows an exemplary embodiment which substantially corresponds to the exemplary embodiment of FIG. 4. Here, the plate 110 and the backplate 120 lie horizontally one above the other. In the centre of the fastening system 100, the plate 110 has coupling-on recesses 111, of which three are shown in FIG. 5a. The coupling-on recesses 111 are surrounded in a radial direction by the coupling-on element 150, which in this exemplary embodiment is formed integrally with the backplate 120. Adjoining this in a radial direction, the fastening system 100 has fastening means 160, which in this exemplary embodiment are formed as cylindrical bodies of the backplate, which are fastened by means of nuts to the backplate 120. Further to the outside in the radial direction, the plate 110 has alignment elements 112, which in this case have an external thread, extend through corresponding recesses 122 of the backplate 120, and are fastened by means of alignment devices 140 in the form of nuts 142 to the backplate 120. At the position of the alignment elements 112, peelable shims 130 determine the spacing between plate 110 and backplate 120. Radially further to the outside, the plate 110 abuts against the aircraft skin 300, whereas the backplate 120 extends radially further outwards for the purposes of fastening to the aircraft skin 300.

The exemplary embodiment shown in FIG. 5b differs from the exemplary embodiment shown in FIG. 5a by the form of the alignment elements 112, alignment devices 140 and fastening means 160. The alignment elements 112 shown here are formed as cylindrical hollow bodies with an internal thread. The recesses 122 of the backplate in this case each have cylinder walls 123, which surround the alignment elements 112. The alignment devices 140 comprise screws 141, the threads of which are adapted to the internal threads of the alignment elements 112, and the heads of which lie on the ends of the cylinder walls 123. The fastening means 160 are in the form of screws, which are screwed into corresponding receptacles of the backplate 120 and of the plate 110.

The exemplary embodiment shown in FIG. 5c differs from the exemplary embodiment shown in FIG. 5b by the form of the coupling-on element 150 and of the fastening means 160. In this exemplary embodiment, the coupling-on element 150 is formed integrally with the plate 110 and has an external thread. By means of a corresponding nut, the coupling-on element 150 in this exemplary embodiment accordingly also functions as fastening means 160.

The fastening systems 100 shown in FIGS. 5a to 5c each have an optional seal ring 170, which is arranged outside the coupling-on element 150 between plate 110 and backplate 120. Such a seal ring 170 is advantageously provided in order to improve the isobaric coupling of a static probe onto the coupling-on recesses 111.

Figure 6:
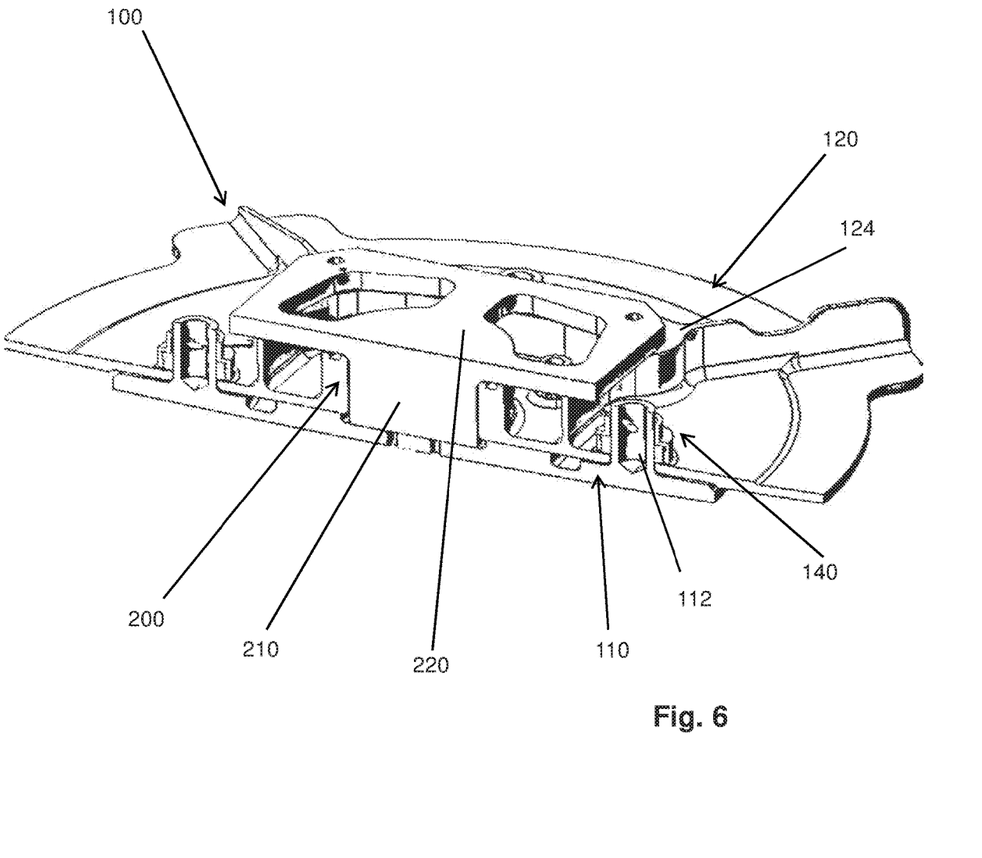
FIG. 6 shows a schematic view of a fastening apparatus having a clamping apparatus.

FIG. 6 shows a sectional view of the fastening system 100 from FIG. 4 in a mounted state including a clamping apparatus 200. The clamping apparatus 200 comprises a body 210, which fills the cavity defined by the coupling-on element 150, and a fixing plate 220, which is connected to the fastening devices 121.

For the functioning of a static probe during flight, said static probe should be connected as far as possible isobarically to the coupling-on recesses 111. For this purpose, the fastening system 100 should be attached to the aircraft skin 300 without undesired deformations. It is however not expedient for the static probe to be attached to the fastening system 100 during the mounting process. A clamping apparatus 200 as shown here permits a deformation-free attachment of the fastening system 100 to the aircraft skin 300.

For the description of the invention, the expression "aerodynamic plate" has been used at some points. This serves merely for clearly delimiting that plate which is not the backplate from the backplate. The expression aerodynamic plate" is commonly used in the aviation sector for this component of a fastening system for a static probe. The use of the expression "aerodynamic plate" is however not intended to be understood to mean that the plate must have yet further features, in particular with regard to its aerodynamic characteristics, in addition to the features described in conjunction with the present invention.

The exemplary embodiments described here are not intended to be understood as limiting the present invention. Even though only advantageous circular plates and backplates have been shown here, rectangular, square or other polygonal plates and backplates are however also conceivable. The plate, backplate and other constituent parts of a fastening system may be manufactured from any materials commonly used in aeronautical engineering, such as for example plastics, in particular fibre composite plastics, or metal, in particular corrosion-resistant steel.

The exemplary embodiments shown in the figures are also not intended to be regarded as being exhaustive and mutually exclusive. Where appropriate, individual features of one exemplary embodiment may by all means be combined with features of another exemplary embodiment.

LIST OF REFERENCE DESIGNATIONS

100 Fastening system
110 Plate
111 Coupling-on recess
112 Alignment element
120 Backplate
121 Fastening device
122 Recess
123 Cylinder wall
124 Wall element
130 Peelable shim
140 Alignment device
141 Screw
142 Nut
143 Splint
144 Cover
150 Coupling-on element
160 Fastening means
161 Peelable spacer element
170 Sealing ring
200 Clamping apparatus
210 Body
220 Fixing plate
300 Aircraft skin While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A probe fastening system, comprising:
a plate having at least one coupling-on recess and having at least two alignment elements arranged in the outer region of the plate, the at least two alignment elements having a cylindrical form extending from a surface of the plate and integrally formed with the surface of the plate;
a backplate having a fastening device for the fastening of a static probe and at least two recesses corresponding with the at least two alignment elements;
at least two peelable shims corresponding with the at least two alignment elements and arranged between the plate and the backplate;
at least two alignment devices corresponding with the at least two alignment elements, the at least two alignment devices configured to extend from a surface of the backplate and to align with the at least two recesses of the backplate to receive corresponding ones of the at least two alignment elements, the at least two alignment devices comprising a corresponding splint configured to be inserted into a corresponding hole of the corresponding alignment device; and
a coupling-on element defining a cavity and configured for isobarically coupling the static probe onto the coupling-on recess,
wherein each of the at least two alignment elements is surrounded by one of the at least two peelable shims, and
wherein the at least two alignment elements are arranged symmetrically on the plate.

2. The fastening system according to claim 1, wherein the at least two alignment elements comprise an even number of alignment elements arranged pairwise on substantially opposite sides of the plate.

3. The fastening system according to claim 2, wherein the at least two alignment elements comprise four alignment elements arranged rotationally symmetrically.

4. The fastening system according to claim 1, wherein the at least two alignment elements comprise an external thread; and the at least two alignment devices comprise nuts with internal threads adapted to the external threads of the at least two alignment elements.

5. The fastening system according to claim 4, wherein each of the at least two alignment elements has a laterally arranged recess; and the splint is configured to be inserted into and wedged in the recess of one of the at least two alignment elements.

6. The fastening system according to claim 5, wherein the at least two alignment elements are of hollow form.

7. The fastening system according to claim 4, wherein the at least two alignment devices comprise a cover arranged in each case over one of the at least two alignment elements.

8. The fastening system according to claim 1, further comprising fastening means for fastening the plate to the backplate.

9. The fastening system according to claim 8, wherein the fastening means comprise a peelable spacer element.

10. The fastening system according to claim 1, wherein the backplate has a wall element and the fastening device are formed as part of the wall element.

11. The fastening system according to claim 1, wherein the coupling-on element is formed integrally with the plate.

12. The fastening system according to claim 1, wherein the coupling-on element is formed integrally with the backplate.

13. A clamping apparatus for the mounting of a fastening system according to claim 1 onto an aircraft skin, wherein the clamping apparatus comprises:
a body configured to fill the cavity defined by the coupling-on element; and
a fixing plate configured to be connected to the fastening device.

14. An aircraft having a fastening system according to claim 1 arranged on the fuselage of the aircraft, wherein the fastening system is arranged such that one of the at least two alignment elements of the fastening system is oriented in a direction of flight of the aircraft.

\* \* \* \* \*